(12) United States Patent
Gustavsson

(10) Patent No.: US 6,741,866 B1
(45) Date of Patent: May 25, 2004

(54) FADE MARGIN TEST

(75) Inventor: Per-Olof Gustavsson, Pixbo (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 673 days.

(21) Appl. No.: 09/589,809

(22) Filed: Jun. 9, 2000

(30) Foreign Application Priority Data

Jun. 11, 1999 (SE) .............................................. 9902209

(51) Int. Cl.$^7$ ................................................ H04Q 7/20
(52) U.S. Cl. ........................ 455/522; 455/504; 370/318
(58) Field of Search ................................ 455/522, 3.01, 455/69, 427–430, 446, 423, 67.11, 504, 505; 370/318

(56) References Cited

U.S. PATENT DOCUMENTS

| | | |
|---|---|---|
| 4,580,262 A | 4/1986 | Naylor et al. |
| 5,574,984 A * | 11/1996 | Reed et al. ................ 455/69 |
| 5,669,063 A | 9/1997 | Brockel et al. |
| 5,722,051 A * | 2/1998 | Agrawal et al. ............ 455/69 |
| 6,058,107 A * | 5/2000 | Love et al. ................. 370/332 |
| 6,072,990 A * | 6/2000 | Agrawal et al. ............ 455/69 |
| 6,205,172 B1 * | 3/2001 | Makinen .................... 375/227 |

FOREIGN PATENT DOCUMENTS

| | | |
|---|---|---|
| WO | 96/31009 | 10/1996 |
| WO | 99/12266 | 3/1999 |

* cited by examiner

*Primary Examiner*—Nay Maung
*Assistant Examiner*—Nick Corsaro (57) ABSTRACT

According to the invention, a fade margin test value for a radio link is calculated according to a routine whereby the output power of the transmitter is gradually decreased until the forward error correction activity FCA reaches a predetermined value, FCA1, whereupon the output power is regulated back to a duty level again. The reduction in output power is performed when the link is operating in a normal way, i.e. while communication may be transmitted on the link. Subsequently, a fade margin test value FM is determined as the ratio related to the nominal output power and the output power corresponding to the predetermined forward error correction value FCA1 at the reduced power level. Finally, the output power is increased to nominal output power.

12 Claims, 6 Drawing Sheets

FADE MARGIN TEST

This application claims priority under 35 U.S.C. §§119 and/or 365 to 9902209-7 filed in Sweden on Jun. 11, 1999; the entire content of which is hereby incorporated by reference.

FIELD OF THE INVENTION

The present invention relates to preventive performance testing for a radio system comprising a transmitter and a receiver and more specifically to in-service measurements of the fade margin in a radio relay system.

BACKGROUND OF THE INVENTION

Radio relay systems or radio links work with a certain fade margin between the received input power level and the receiver detection threshold in order to encounter various conditions affecting the reception of the transmitted signal. For instance, the transmitted signal may be subject to varying climatic attenuation due to rain or due to multi-path propagation caused by refractivity gradients in the atmosphere. Moreover, varying interference signal levels from other radio sources may influence the detection threshold negatively.

If the received signal is falling under the detection threshold, a traffic interruption may occur. Over a given period of time, these interruptions can be described by means of the cumulative outage time. Typically, network providers require such a high quality of service that the cumulative outage time should not exceed a limit, which could be as low as 10 minutes per year.

The designer of the radio relay system is faced with the task of providing a link, which fulfils these requirements. Moreover, the radio relay system must comply with current regulations on radio emission values, which applies for a given site and frequency band, whereby the output power of the radio relay system may not exceed a certain limit.

The radio link should be dimensioned having a sufficient fade margin in order to achieve reliable performance. The fade margin may for instance be expressed as the amount of extra output power which should be available under normal clear sky conditions in order to guarantee a given minimum bit error rate threshold for the received signal under worst case conditions.

Therefore, before the radio link can be taken into operation an estimation of worst case conditions must be made such that the necessary fade margin can be found.

In the following, a prior art radio link as well as known dedicated measurement equipment used in connection with the installation shall be explained together with a known procedure for measuring the fade margin. Reference is made to the block diagram of the prior art apparatus shown in FIG. 1.

Figure 1:
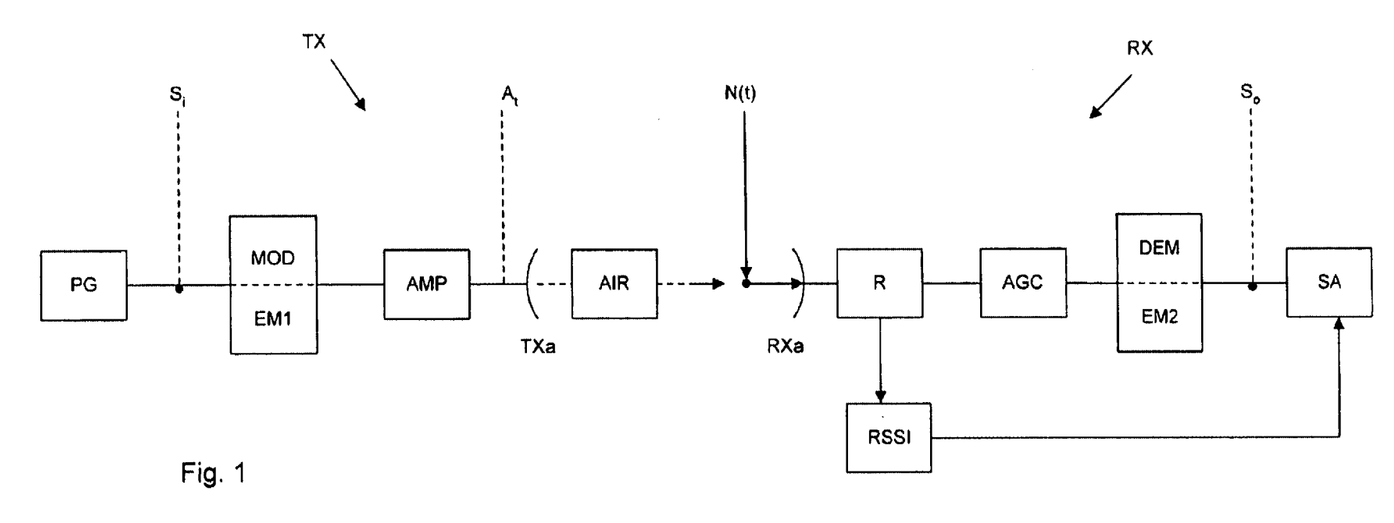
FIG. 1 shows a block diagram of a known radio link and known measurement equipment.

The radio link comprises the following elements on the transmitter side: A modulator, MOD typically comprising forward error correction encoding means, EM1, and having an input terminal to which the input signal Si is provided, a power amplifier, AMP coupled to the modulator MOD, a transmit antenna, TXa. Optionally, the path between the power amplifier AMP and the transmit antenna TXa can be disconnected for measurement purposes.

The radio link comprises the following elements on the receiver side: A receiving antenna, RXa, a reception signal level meter, RSSI, providing a numerical value indication of the reception level, an automatic gain control element, AGC, and a demodulator, DEM, typically comprising forward error correction decoding means, EM2, and providing at its output terminals the forward error corrected signal, So. As is well known, the use of forward error correction (FEC) implies that a certain level of the signal content being transmitted is redundant. The forward error correction coding renders the system more robust such that, even if the signal level falls under the detection threshold for a certain period of time, it is possible to restore the original content of the code.

A measurement equipment comprising the following elements is used in connection with the installation of the radio link described above: A pattern generator, PG, is shown coupled to the signal input at the modulator, MOD and signal analyser, SA, is coupled to the output side at So. From an analysis of the generated signal and the received signal, the bit error rate can be calculated.

As shown in FIG. 1, the physical effect of antenna/air interface is represented by function block AIR, while contributions from surrounding radio sources have been indicated by means of source $N(t)$.

During measurements, an attenuation block (not shown), can be inserted in the signal path between the amplifier AMP and the transmit antenna TXa at point At in order to attenuate the signal thereby simulating the attenuation which would be caused by bad weather.

When the projection and physical installation has been completed for a given radio link, the measurement equipment described above is coupled to the equipment and fade margin tests can be undertaken.

By attenuating the transmitted signal, under stable atmospheric conditions, the bit error rate of the output signal of the demodulator can be mapped as a function of the signal attenuation or input signal strength. These measurements are performed taking into account the current noise level from other sources.

The installation/fade margin test process can be described as iterative, whereby system design parameters, such as antenna configuration and placement, are changed until these values match the required fade margin.

In prior art document WO96/31009 a two way adaptive power control for a two way link has been described in which the signal deterioration measured in terms of a bit error rate on each respective link are taken into account for regulating the power emission.

The transmitter/receiver system according to the above document comprises a feedback path in which the output power of the transmitter is regulated in correspondence with the input power measured by the receiver or in correspondence with the signal to noise ratio of the signal measured by the receiver.

However, one problem with the system described according the above document is that the user of such a system always transmits with the lowest transmitter power level that ensures error-free transmission. This user will not gain any benefits from this mechanism; only other users in the vicinity will gain. Moreover, it is difficult to prove that a stable system can be achieved in a complex environment with hundreds of users with mutual interference paths. The result is that users will not choose such a system, since mainly others, who are typically competitors, will gain.

SUMMARY OF THE INVENTION

As follows from the above description, the known fade margin test process is time and manpower consuming.

Moreover, fade margin tests can only be applied prior to the actual operation, because no traffic can be sent on the link when the measurement equipment is inserted in the signal path.

In a steadily changing situation where new radio sources are continuously installed in the environment, it is of course difficult to assess the actual fade margin. Over time, the noise level may increase so much that the fade margin implemented at installation may prove to be insufficient.

Therefore, it is a first object of the present invention is to accomplish a performance test for a radio system and more specifically an in service fade margin test for a radio relay system, in order to ensure that the required fade margin is prevalent.

This object has been achieved by the subject matter set forth in independent method claim 1 and independent apparatus claim 9.

The test according to the invention is advantageously performed during a short period of time without interrupting the traffic messages being sent on the link.

It is another object to accomplish a performance test based on monitoring the output power level of the transmitter.

This object has been achieved by the subject matter defined by claim 2.

It is another object to achieve a performance test based on monitoring the input power level of the receiver.

This object has been achieved by the subject matter defined by claim 3.

The fade margin test according to the invention is either initiated when desired or initiated automatically by clock-initialisation, i.e. while the path is operating in a traditional way.

Further advantages will appear from the remaining claims and the following detailed description of the invention.

DETAILED DESCRIPTION OF A PREFERRED EMBODIMENT OF THE INVENTION

Figure 2:
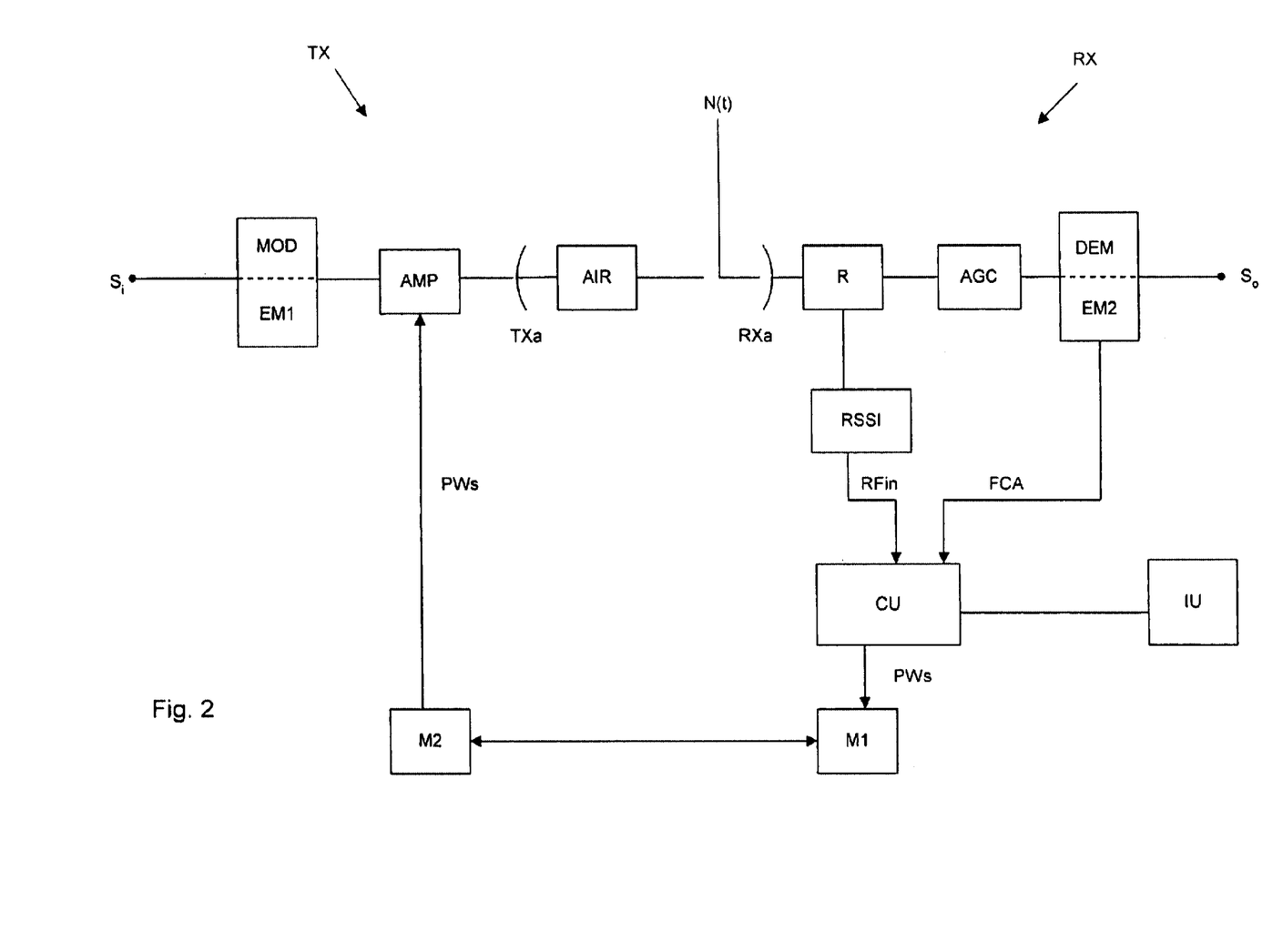
FIG. 2 is a block diagram of a first embodiment according to the invention.

In FIG. 2, a first embodiment of the radio relay system according to the invention has been shown.

The radio relay system comprises a transmitter TX, comprising a modulator MOD, Amplifier AMP, antenna TXa and a receiver RX, comprising antenna RXa, automatic gain control element AGC and demodulator DEM. The radio relay system is adapted for transmitting digital data.

The transmitter and receiver comprises respective forward error correction means EM1 and EM2, for performing forward error correction on the transmitting signal. The forward error correction means EM2 is being adapted for providing a value, FCA, being indicative of the current correction activity being performed on the communication channel under normal operation.

In the embodiment in FIG. 2, the receiver comprises a receiver signal level meter RSSI for producing a reception power signal Rfin, indicative of the signal strength at the receiver.

The relay system furthermore comprises a control unit, CU, comprising a central processor and various interfaces, the control unit being adapted for receiving the reception signal strength signal Rfin and the forward error correction activity signal FCA. The control unit CU issues a power control signal PWs.

The amplifier AMP has means for adjusting the output power of the transmitter in dependence on the power control signal PWs.

The relay system furthermore comprises means for transferring data, comprising the power control signal PWs, on an alternative channel, such as over the public switched telephone network or on an overhead channel in the relay system. The relay system comprises two overhead units M1 and M2 for transmitting these signals.

An interface unit IU provides external access to the central unit CU and the data obtained by the central unit CU.

The function of the apparatus according to the invention shall now be described with reference to FIG. 3.

Figure 3:
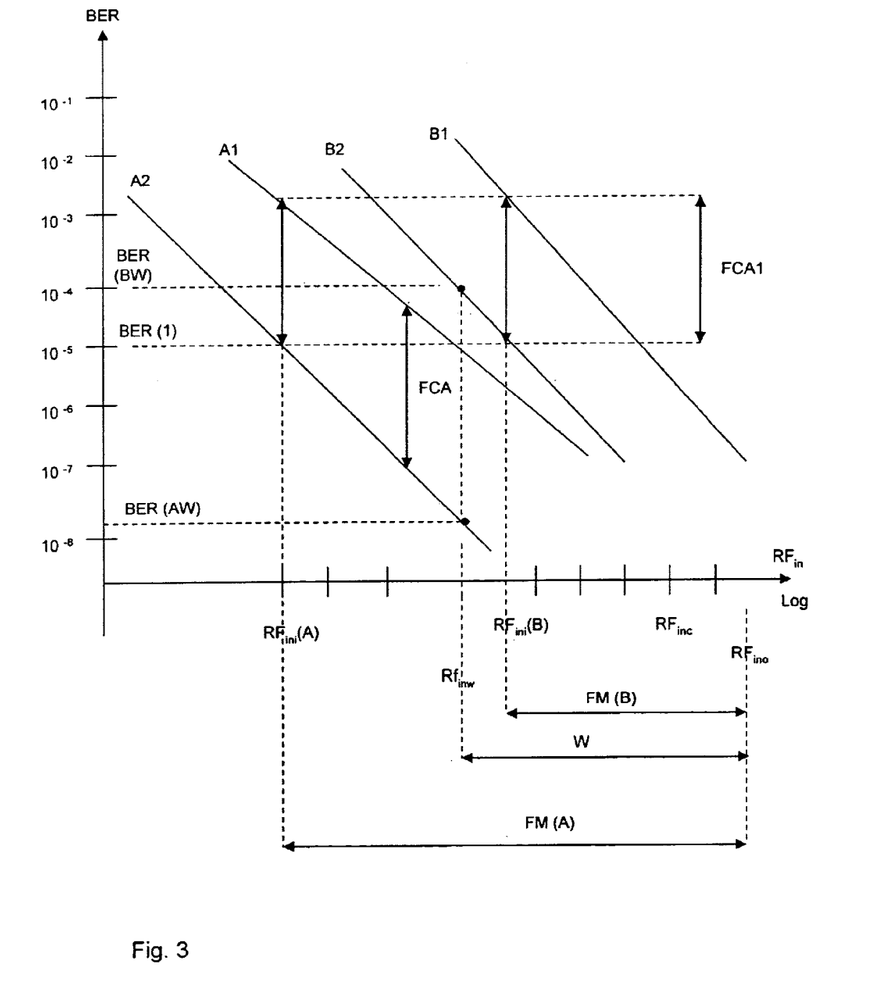
FIG. 3 is a schematic representation of the bit error rate, respectively before and after performance of forward error correction, as a function of input power level under a first noise level (A) and a second enhanced noise level (B), respectively.

In the example shown on FIG. 3, the bit error rate of the input signal has been shown as a function of the input power level, respectively before and after forward error correction has been performed in the receiver. The graph designated A1 represents the bit error rate before forward error correction, while the graph A2 represents the bit error rate after forward error correction.

For illustrative purposes, the graphs have been drawn as straight lines. However, it should be understood that the graphs could be curved.

Attenuation caused by weather has the effect that the input power at the receiver is decreased. Hence, the expected variations in the bit error rate can be found from assessing the variation in the input power level, corresponding to the weather caused attenuation and reading the bit error rate which appears from graph A2.

Graphs A1 and A2 may for instance correspond to the interference situation, which applied when the radio link was established. During installation, the design parameters would normally be chosen such that the fade margin would be sufficiently large to give room for a certain future increase in noise level.

As mentioned under the prior art procedure, tests should be undertaken to establish an estimate for the minimum input power value, Rfinw, corresponding to an assessed worst case weather attenuation of the input signal.

In FIG. 3, the input power values Rfinc indicates the input power at the receiver at clear sky conditions and Rfin0 indicates an ideal nominal input power level, which serves as a reference level for defining the fade margin. Rfin0 could be set as the input power value, which appears on given a clear day, Rfinc. A worst case signal deterioration margin, W, has been defined as the difference between the ideal nominal input power level and the worst case input power level.

From the example shown on FIG. 3, it is seen that the location of graphs A1 and A2 gives ample room for bad weather attenuation at the given noise level. In fact, the fade margin is chosen so high that a bit error rate above BER(Aw) (the bit error rate corresponding to the assessed worst case level, Rfinw) is sufficient unlikely to occur.

Now, if the noise level increases at a later stage, graphs A1 and A2 no longer apply. The detection threshold in the receiver is adversely affected and the graphs are changed to the right. The new situation is represented, by way of example by graph B1, representing the bit error rate before forward error correction and graph B2, after forward error correction. It is noted that under the new enhanced noise level the worst case bit error rate would correspond to a bit error rate of BER(Bw) 10exp−4, which by way of example may be found unacceptable.

It should be noted that the graphs and corresponding bit error rates shown in FIG. 3 are only exemplary and that they do not necessarily represent true values. Moreover, the linear shape of the graphs is schematic.

As mentioned above, the network provider typically seeks a guarantee for a desired maximum bit error rate after forward error correction.

As appears from graphs A1, A2, B1 and B2, a certain given forward error correction activity, FCA, corresponds to a certain bit error rate, BER.

If for instance the maximum acceptable bit error rate is BER(1) (10exp−5), the corresponding forward error correction activity is found as the vertical difference between graphs A1 and A2, which is the value FCA1.

In FIG. 3, the fade margin corresponding to the noise level prevailing under situation A has been indicated by the distance FM(A). Likewise, the fade margin in situation B has been indicated by the distance FM(B).

In situation A, it is seen that the fade margin FM(A) largely exceeds the critical value W. In situation B, however, the fade margin FM(B) is less than the required fade margin W. If a worst case situation occurs, under the noise level given by B, it is seen that the bit error rate after correction would amount to the "unacceptable" level BER(Bw) (10exp−4) if the attenuation accounted for as low a value as Rfinw.

It is the purpose of the present invention to evaluate the actual fade margin during operation.

According to the invention, a fade margin test value is calculated according to a first routine whereby the output power of the transmitter is initially transmitting at nominal output power. Then the output power of the transmitter is gradually decreased until the forward error correction activity FCA reaches a predetermined value, FCA1. This drop in output power can be performed while the link is used for ordinary communication. Subsequently, a fade margin test value FM is determined as the ratio between a signal related to the reduced output power corresponding to the predetermined forward error correction value (FCA1) and a fixed reference value. Finally, the output power is increased to nominal output power.

According to the FIG. 2 embodiment, the decrease in output power is based on a measurement of the received input power, provided by receiver power level meter RSSI. The fade margin is determined as the ratio between the reduced input power level Rfin1 and a fixed reference power input level, Rfin0. This reference level can be set for instance, slightly above what is known to be the clear sky receiver input power Rfinc.

As shall be explained later, the decrease in output power may be based on a measurements of the emitted output power after the AMP stage in the transceiver or measurements performed in the vicinity of the transmit antenna.

The above routine would advantageously have a relatively short duration. Hence, the cumulative number of bit errors will only increase insignificantly due to the extra errors, which are "produced" during the routine. The routine can be performed as often as necessary and would advantageously be performed automatically on a periodic basis.

It should be noted that the fade margin test described above would not lead to interruptions of the traffic flow, if the worst case weather caused attenuation is rare. If situation B should occur, because of an increase in activity from other sources, it is seen that the output power would only be adjusted down to the value FCA1 which corresponds to an input power Rfin1(B), for which the corresponding bit error rate per definition amounts for BER(1), (10exp−5), which is still within ample distance from the lower critical value of Rfinw.

Fade margin tests may be carried out according to the first routine described above as often as necessary. If the calculated fade margin test value FM(t) approaches or falls below W, the effective bit error rate would assert the critical value of the maximum desired BER value.

Figure 4:
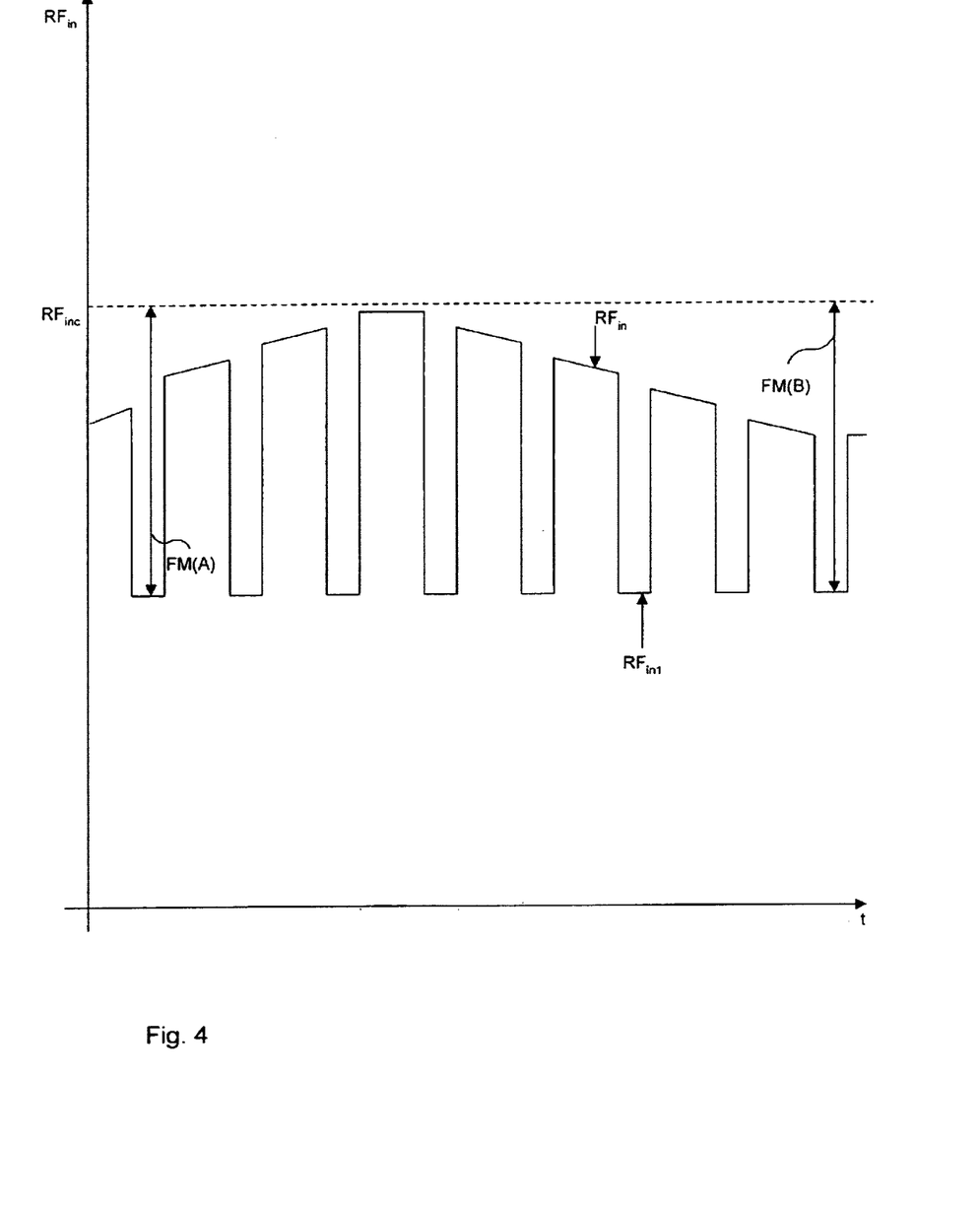
FIG. 4 is a schematic representation of signal levels according to the first embodiment according to the invention.

In FIG. 4, is a schematic representation of the input power level according to periodic application of the first routine in the first embodiment of the invention. The maximum input power value Rfin represents the assessed clear sky input power RfinC and has been chosen as reference value Rfin0. It appears that the in-duty input power changes over time due to changing climatic conditions. The reductions in input power, Rfin1, which are generated according the first routine, defines a representation of how the fade margin, FM, changes over time. By way of example, the fade margin test values FM(A) and FM(B) corresponding to situation A and B, respectively have been indicated.

According to a further aspect of the invention, a warning signal is issued if this situation occurs under test of the fade margin thereby enabling corrective action to be taken before an adverse propagation situation occurs.

If the fade margin reaches a critical level, the radio link must be re-configured such that a maximum expected cumulative outage time can be guaranteed.

According to a further aspect of the invention, measurements of the actual fade margin may only be carried out in good weather, e.g. when Rfin is above a certain value for a certain period. Thereby it is accomplished that the cumulative number of bit errors generated under the first routine can be kept very low.

The first routine is only performed when an indication according to a second routine indicates that a clear sky condition prevails. The second routine implies that transmission is carried out at nominal maximum output power Pout=Pnom, while the input power level, Rfin, is monitored. When the input power level is above a predetermined first upper limit for a predetermined period of time, an indication that a clear sky condition prevails is established.

Optionally, the forward error correction activity value FCA and the actual forward error rate BER are monitored. Should any of these values reach critical level the fade margin routine is interrupted enhancing the output power back to nominal output power.

Second Preferred Embodiment of the Invention

Figure 5:
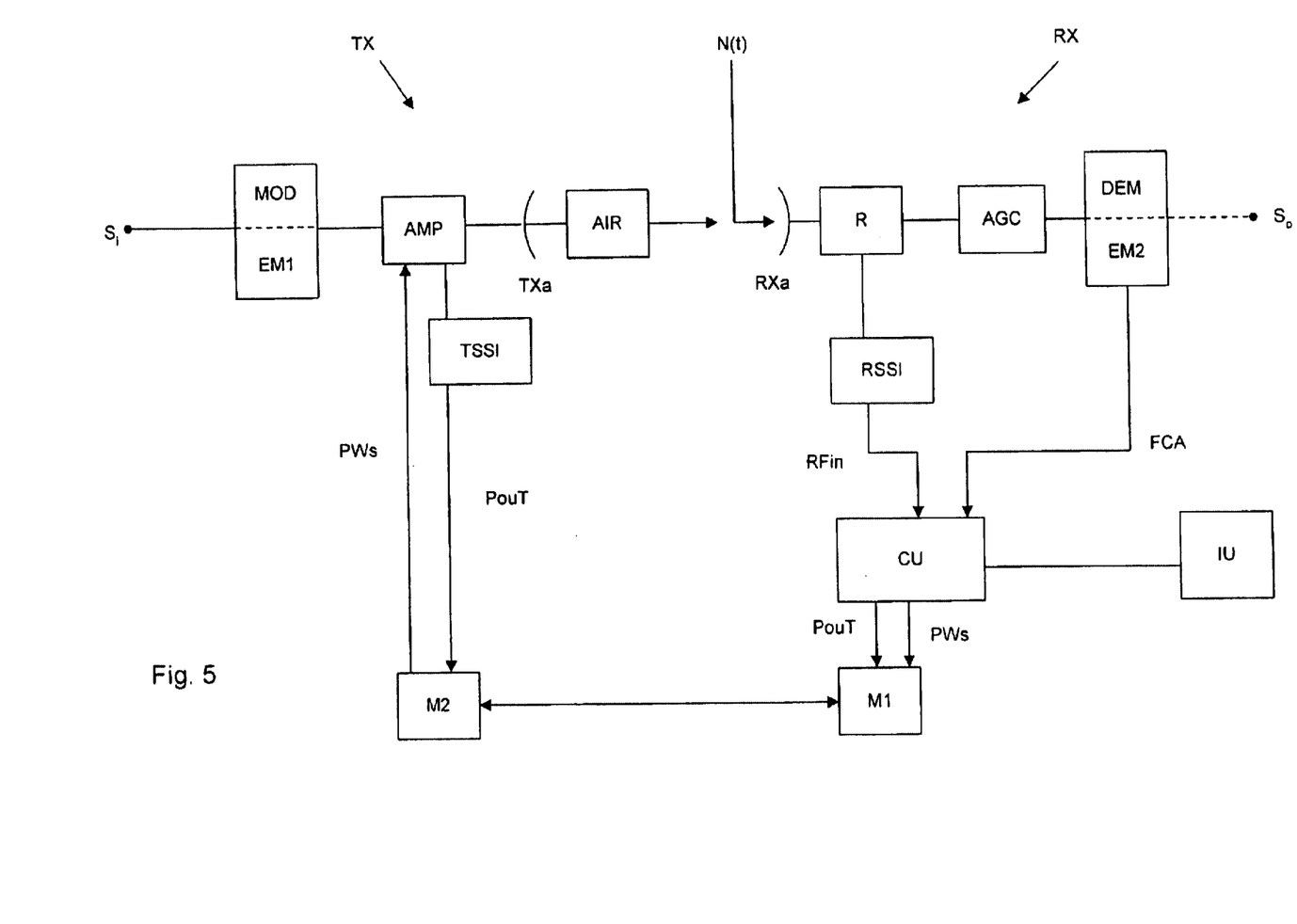
FIG. 5 is a block diagram of a second embodiment of the invention.

In FIG. 5, an alternative embodiment has been shown. This embodiment differs from the embodiment according to FIG. 2 in that instead of evaluating the received power level, the output power level is directly evaluated for producing the fade margin test value. Again, the output power Pout is reduced until a predetermined forward error correction activity is produced. However, in this embodiment the fade margin test is only calculated when clear sky conditions, S, are found to exist.

For this purpose the output power level Pout from the amplifier AMP is evaluated by transmitter signal power level meter TSSI and issued to overhead unit M2. The output power level Pout is communicated to overhead unit M1 from which it is provided to control unit CU.

The assessment of clear sky conditions may be found as described under the first embodiment. In the embodiment according to FIG. 5, the receiver input power level meter RSSI is used to assess whether clear sky conditions prevail.

According to the second embodiment the in-service fade margin test routine could advantageously be performed automatically on a periodic basis or when requested. Optionally the routine may be carried out only when clear sky conditions are found to exist.

Figure 6:
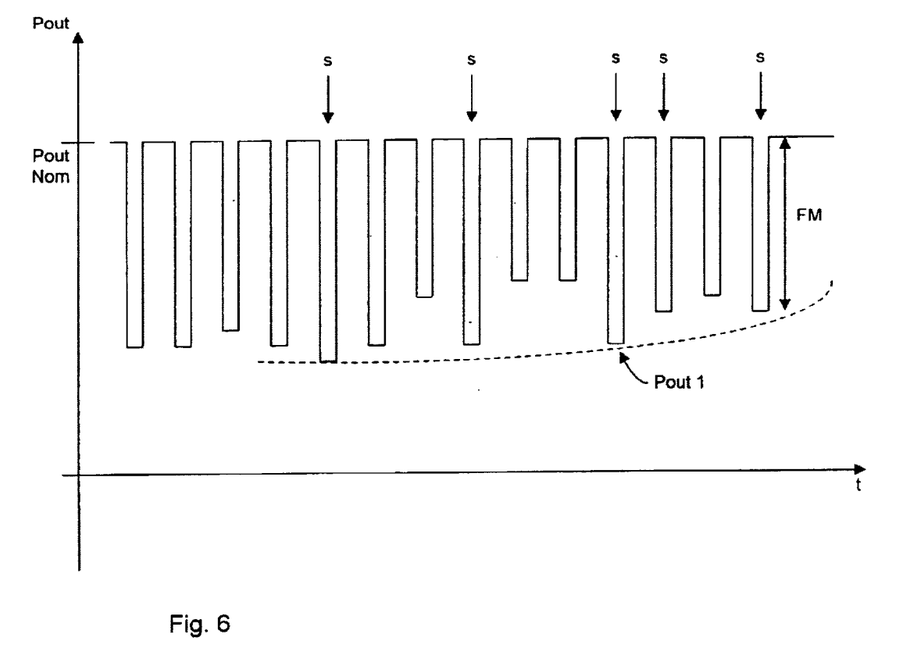
FIG. 6 is a schematic representation of signal levels according to the second embodiment of the invention.

In FIG. 6 the variations in output power generated according to the second embodiment has been illustrated. The normal in-duty output power level has been designated as Poutnom while the reduced power level generated according to the fade margin test value routine has been designated Pout1. It should be understood that fade margin test value would only be based on values when clear sky conditions, being designated with the arrows S, are found to exist. Again, it should be noted that the figures are only schematic and that the output drops according to the first routine could be of a very short duration.

As an alternative to the signal values indicated in FIG. 6, the routine for may only be carried out when clear sky conditions are found to exist, i.e. at those points in time denoted by arrows S.

Alternatively, a statistical method may be used for finding the applicable fade error margin test values, i.e. whereby the minimum values Pout1 within a predetermined time interval are identified.

It would be clear to the person skilled in the art that signals such as, field strength signals, may be used instead of signal power levels for evaluating the test fade margin according to the invention. Likewise, alternative reference values may be chosen for producing the fade margin test values as should be comprehended by the scope of the appended claims.

What is claimed is:

1. Process for performing in operation fade margin tests in a radio relay system under interference from other radio sources, the relay system having a transmitter (TX) and a receiver (RX), the transmitter and receiver having forward error correction means (EM) for performing error correction of the received signal and means for providing a means of the forward error correction activity (FCA), the process involving a first routine comprising the following steps transmitting at nominal output power, decreasing the output power level of the transmitter gradually until the forward error correction activity reaches a predetermined value (FCA1), while continuing communicating, determining a signal level (Rfin1, Pout1) related to the reduced output power level, determining a fade margin test value (FM) as the ratio of the measured signal level corresponding to the predetermined forward error correction value (FCA1) and a predetermined reference level (Rfin0; Poutnom)

increasing the output power to nominal output power.

2. Process according to claim 1, whereby the fade margin test value (FM) is being based on the measured reduced output power when the forward error correction activity reaches the predetermined value (FCA1) and a predetermined fixed value such as the nominal output power (Poutnom), the fade margin test value only being based on values which appear when clear sky conditions prevail.

3. Process according to claim 1, whereby the fade margin test value is based on the received input power corresponding to the reduced output power when the forward error correction activity reaches the predetermined value (FCA1) and a predetermined fixed value, such as an assessed clear sky input power value (Rfin0, Rfinc).

4. Process according to claim 1, wherein a warning signal is issued if the fade margin test value (FMt) is less than a predetermined value (W) being indicative of an assessed worst case weather situation.

5. Process according to claim 1, wherein the first routine is only performed when an indication according to a second routine indicates that a clear sky condition prevails, the second routine involving transmitting at nominal output power (Pout=Pnom), while monitoring the input power level (Rfin) and when the input power level is above a predetermined first upper limit for a predetermined period of time, establishing an indication that a clear sky condition prevails.

6. Process according to claim 1, wherein the first routine is interrupted and the output power (Pout) is immediately adjusted to nominal value should the corrected number of bits exceed a critical value.

7. Process according to claim 1 wherein, the first routine is initiated on a regular basis.

8. Process according to claim 1 wherein, the first routine is initiated on request.

9. Relay system having a transmitter (TX) and a receiver (RX) for transmitting digital data over a communication channel, the transmitter and receiver having respective forward error correction means (EM1, EM2) in which forward error correction is performed, the forward error correction means being adapted for providing a value (FCA) being indicative of the current correction activity being performed on the communication channel under normal operation, the radio relay system furthermore having means for producing a signal (Rfin, Pout), being indicative of the output power of the transmitter, the relay system furthermore comprising a control unit (CU) being adapted for receiving and the signal (Rfin, Pout) being indicative of the output power of the transmitter and the forward error correction activity signal (FCA), the control unit (CU) being adapted for issuing a power control signal (PWs), the transmitter (TX) having means (AMP) for adjusting the output power of the transmitter in dependence on the power control signal (PWs), the relay system furthermore comprising means for transferring data (M1, M2), comprising the power control signal (PWs), on an alternative channel, the control unit (CU) being adapted for performing a first routine in which the output power of the transmitter is decreased to a reduced level where the forward error correction activity (FCA) reaches a predetermined value (FCA1), a signal relating to the reduced output power level (Rfin1, Pout1) is determined, a fade margin test value (FM) is determined as the ratio of a predetermined fixed signal level (Rfin0, Poutnom) and the determined signal relating to the reduced output level (Rfin1, Pout1) corresponding to the predetermined forward error correction value (FCA1).

10. Relay system according to claim 9, wherein the signal (Pout1) relating to the output power level is a signal being directly derived from the means (AMP) for adjusting the output power of the transmitter (TX).

11. Relay system according to claim 9, wherein the signal (Rfin1) relating to the output power level is the input power level at the receiver (RX).

12. Relay system according to claim 9, wherein the control unit is adapted for issuing a warning signal if the fade margin test value (FM) is less than a predetermined value (W).

* * * * *